(12) United States Patent
Nonaka (10) Patent No.: US 8,860,343 B2
(45) Date of Patent: Oct. 14, 2014

(54) ROTARY ELECTRIC MACHINE

(75) Inventor: Tuyoshi Nonaka, Kitakyushu (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 111 days.

(21) Appl. No.: 13/565,801

(22) Filed: Aug. 3, 2012

(65) Prior Publication Data

US 2013/0049651 A1 Feb. 28, 2013

(30) Foreign Application Priority Data

Aug. 22, 2011 (JP) ................................. 2011-180751

(51) Int. Cl.
 H02K 7/00 (2006.01)
 H02K 21/02 (2006.01)
 H02K 7/116 (2006.01)
 H02K 1/27 (2006.01)
(52) U.S. Cl.
 CPC .............. *H02K 21/029* (2013.01); *H02K 7/116* (2013.01); *H02K 1/2766* (2013.01)
 USPC ................... 318/400.02; 318/400.01; 318/700
(58) Field of Classification Search
 CPC ............................... H02P 21/0035; H02P 6/14
 USPC ............................... 318/400.02, 400.01, 700
 See application file for complete search history.

(56) References Cited

U.S. PATENT DOCUMENTS

| 6,563,246 B1* | 5/2003 | Kajiura et al. ................. 310/162 |
| 7,294,988 B2* | 11/2007 | Ajima et al. ................... 318/712 |
| 7,420,312 B2* | 9/2008 | Kitamura et al. ............. 310/263 |
| 7,573,227 B2* | 8/2009 | Kasaoka et al. .............. 318/807 |
| 2006/0290219 A1 | 12/2006 | Rodger et al. |
| 2008/0070707 A1* | 3/2008 | Yamamoto et al. ........... 464/182 |

FOREIGN PATENT DOCUMENTS

| CN | 1799179 | 7/2006 |
| JP | 2001-314068 | 11/2001 |
| JP | 2007-503199 | 2/2007 |
| JP | 2010-074975 | 4/2010 |

OTHER PUBLICATIONS

Japanese Office Action for corresponding JP Application No. 2011-180751, Jun. 25, 2013.
Chinese Office Action for corresponding on CN Application No. 201210298554.5, May 6, 2014.

* cited by examiner

*Primary Examiner* — David Luo
(74) *Attorney, Agent, or Firm* — Mori & Ward, LLP (57) ABSTRACT

A rotary electric machine includes: a stator having a stator winding and a stator core; a rotor having a first magnetic pole section and a second magnetic pole section, where the second magnetic pole section rotates respective to the first magnetic pole section; a shaft provided for the rotor; and a rotary mechanism configured to rotate the second magnetic pole section about the shaft. The rotary mechanism includes: a moving member configured to be movable along the shaft; a lead screw mechanism configured to move the moving member along the shaft; and a rotary member configured to rotate respective to the shaft along with the second magnetic pole section, where the rotary member engages the moving member and the second magnetic pole section.

19 Claims, 12 Drawing Sheets

ROTARY ELECTRIC MACHINE

CROSS-REFERENCE TO RELATED APPLICATION

The present application claims priority under 35 U.S.C. §119 to Japanese Patent Application No. 2011-180751 filed Aug. 22, 2011. The contents of this application are incorporated herein by reference in their entirety.

BACKGROUND

1. Technical Field

The disclosure relates to a rotary electric machine and the like.

2. Related Art

Japanese Unexamined Patent Application Publication No. 2010-074975 discloses a conventional variable field magnet rotary electric machine. This rotary electric machine has an embedded magnet rotor. The magnetic pole of this rotor is axially divided into three sections. Relative rotation of each magnetic pole section changes the field magnetic strength of the rotor.

As illustrated in FIG. 1 of the publication, three magnetic pole sections axially divided in the rotary electric machine includes: two magnetic pole sections disposed on opposite sides and secured to a shaft; and a magnetic pole section disposed at center and configured to relatively rotate with respect to the two magnetic pole sections. These magnetic pole sections are provided with permanent magnets, respectively.

Such a rotary electric machine includes a hydraulic controller provided for a bearing of a counter load side bracket. This hydraulic controller changes the field magnetic strength by supplying a hydraulic pressure to a hydraulic mechanism installed a rotating rotor. The rotary electric machine changes the field magnetic strength of the rotor to allow expansion of a range of variable speed and an operation at higher efficiency.

SUMMARY

A rotary electric machine includes: a stator having a stator winding and a stator core; a rotor having a first magnetic pole section and a second magnetic pole section, where the second magnetic pole section rotates respective to the first magnetic pole section; a shaft provided for the rotor; and a rotary mechanism configured to rotate the second magnetic pole section about the shaft. The rotary mechanism includes: a moving member configured to be movable along the shaft; a lead screw mechanism configured to move the moving member along the shaft; and a rotary member configured to rotate respective to the shaft along with the second magnetic pole section, where the rotary member engages the moving member and the second magnetic pole section.

BRIEF DESCRIPTION OF DRAWINGS

Preferred embodiments of the disclosure will be now described with reference to the drawings. In the drawings, like components are denoted by like reference symbols.

First Embodiment

Figure 1:
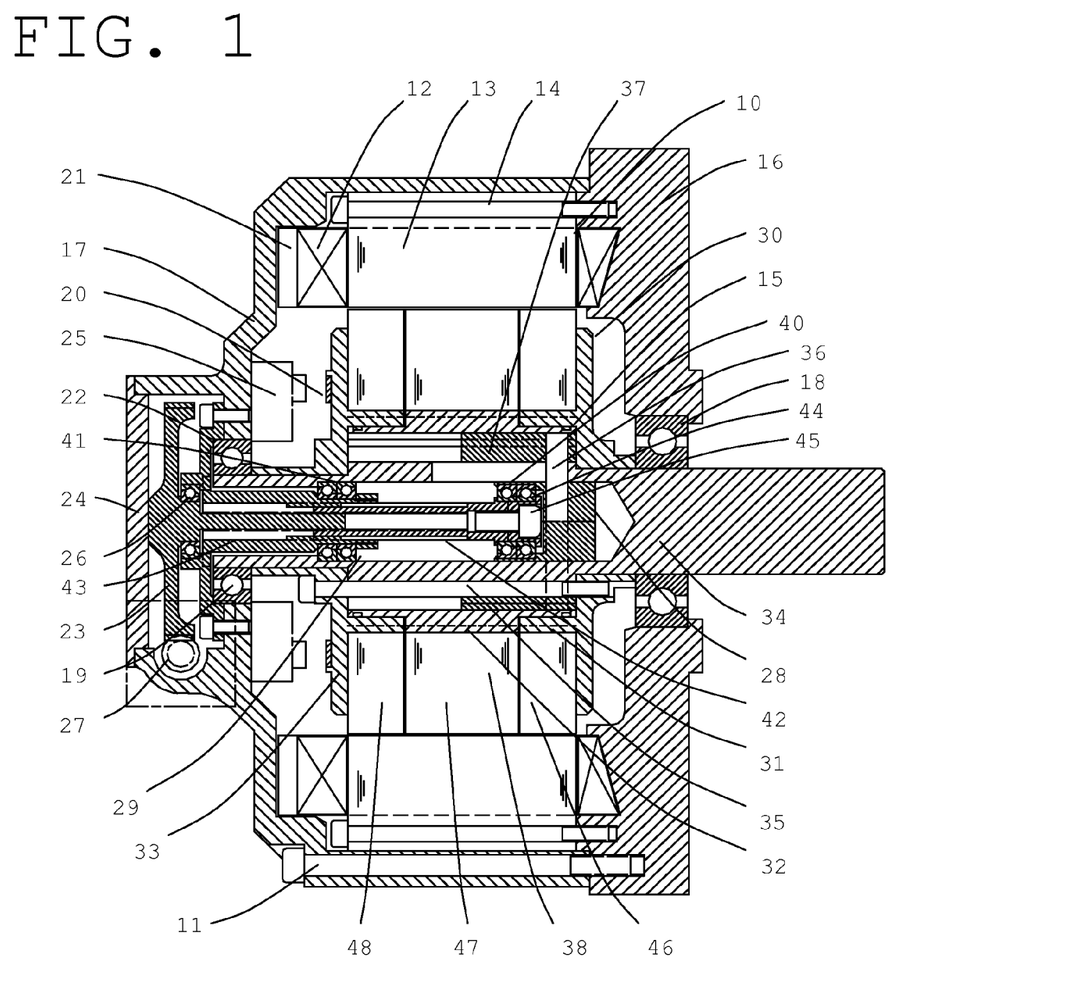
FIG. 1 is an axial sectional view of a rotary electric machine according to a first embodiment of the disclosure.

First, a configuration of a rotary electric machine (first rotary electric machine) according to a first embodiment of the disclosure is described. The first rotary electric machine is a variable field magnet rotary electric machine applied to an electric motor or electric generator for driving a vehicle. FIG. 1 is an axial sectional view of the first rotary electric machine.

Figure 6:
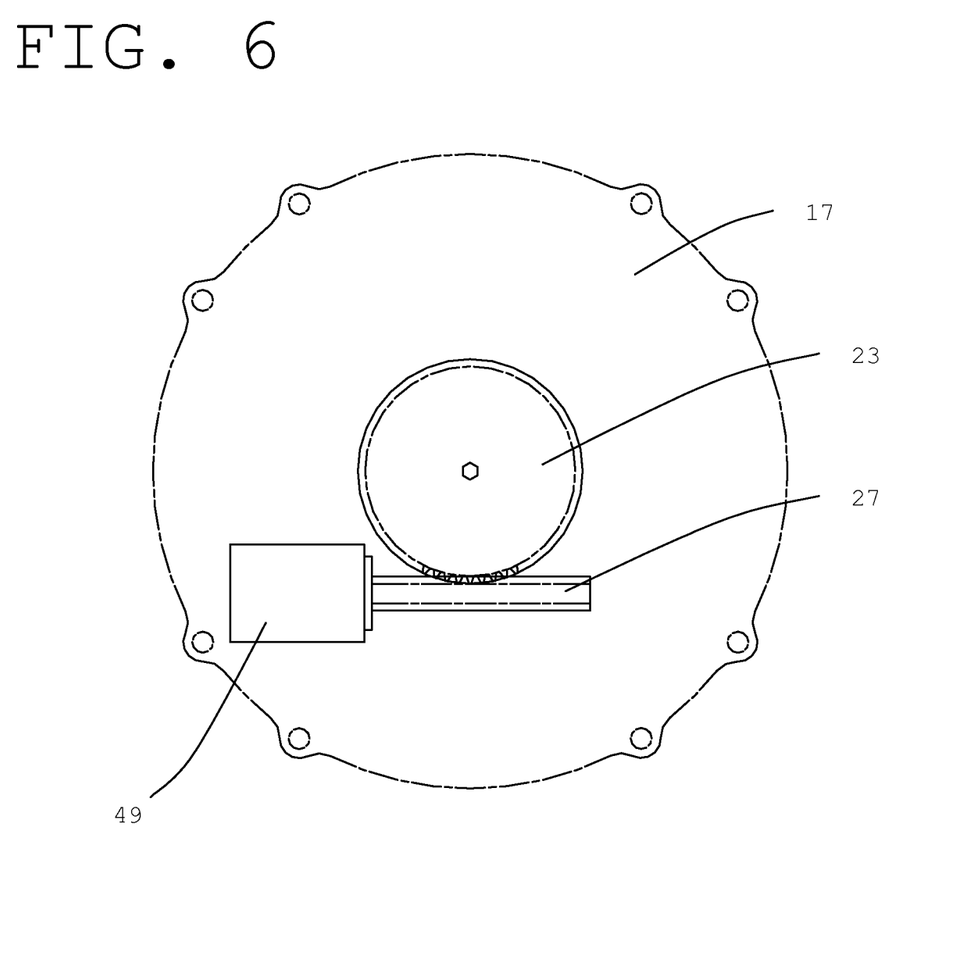
FIG. 6 is an explanatory view illustrating how a control motor is provided.

As illustrated in FIG. 1, the first rotary electric machine includes a stator 10, a rotor 30, a sensor magnet 20, and a rotary position detector 25. The first rotary electric machine also includes a control motor 49 and a rotary mechanism (described later) to which the control motor 49 is attached as illustrated in FIG. 6.

The stator 10 is provided with a stator winding 12 and a stator core 13. The rotor 30 is provided with a shaft (rotor shaft) 34. The rotor 30 includes a plurality of magnetic pole sections each having a field magnet. These magnetic pole sections are grouped into two, and the two groups rotate with respect to each other. The rotary mechanism causes the relative rotation of the two groups of magnetic pole sections in the rotor 30. The control motor 49 is provided on the outside of a frame 17 on the counter load side. The control motor 49 operates the rotary mechanism. The sensor magnet 20 is provided on a side surface of the rotor 30 on the counter load side. The rotary position detector 25 is provided so as to face the sensor magnet 20.

The stator winding 12 is mounted on the stator core 13. The stator core 13 is fastened to a load side bracket 16 by a stator-fastening bolt 14. The frame 17 is fastened to the load side bracket 16 by a bolt 11.

A load side bearing 18 and a counter-load side bearing 19, which are provided for the shaft 34, hold the rotor 30 so that the rotor 30 can rotate relative to the frame 17. The rotary position detector 25 is provided for a counter load side bracket 17. The rotary position detector 25 detects a rotary position of the rotor.

Figure 2:
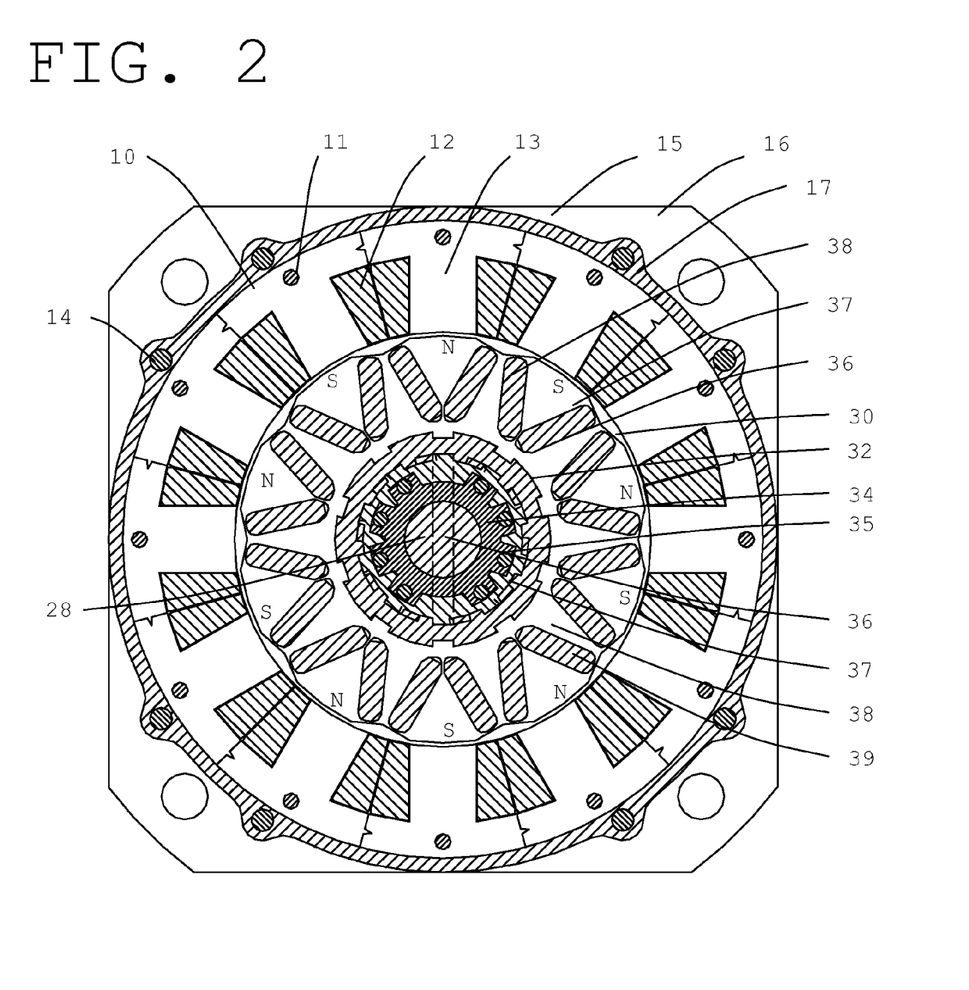
FIG. 2 is a radial sectional view of the rotary electric machine at a mounting section of a field magnetic pole section at the middle.

FIG. 2 is a radial sectional view of the first rotary electric machine at a mounting section of a field magnetic pole section 47 at the middle.

Referring to FIG. 2, the stator 10 includes the stator core 13 composed of twelve pieces. The stator winding 12 as an air core coil is mounted on each piece of the stator core 13.

The field magnetic pole of the rotor 30 is axially divided into three sections (along the direction in which the shaft 34 extends). Specifically, as illustrated in FIG. 1, the field magnetic pole of the rotor 30 includes a load-side field-magnetic pole section (first magnetic pole section) 46, the middle field magnetic pole section (second magnetic pole section) 47, and a counter load-side field-magnetic pole section (first magnetic pole section) 48. The load-side field-magnetic pole section 46 and the counter load-side field-magnetic pole section 48 are provided along the shaft 34 so as to sandwich the middle field magnetic pole section 47.

The load-side field-magnetic pole section 46 and the counter load-side field-magnetic pole section 48 are secured to the shaft 34 by a bolt 35. The middle field magnetic pole section 47 rotates about the shaft 34. Each of the field magnetic pole sections 46 to 48 is configured by a permanent magnet.

As illustrated in FIG. 2, each of the field magnetic pole sections 46 to 48 is mounted in a substantially V-shaped permanent magnet mount hole formed in a rotor core 38. Magnetizing directions of the field magnetic pole sections 46-48 are facing toward or away from each other. The field magnetic pole sections 46 to 48 constitute 10 magnetic poles.

Figure 3A:
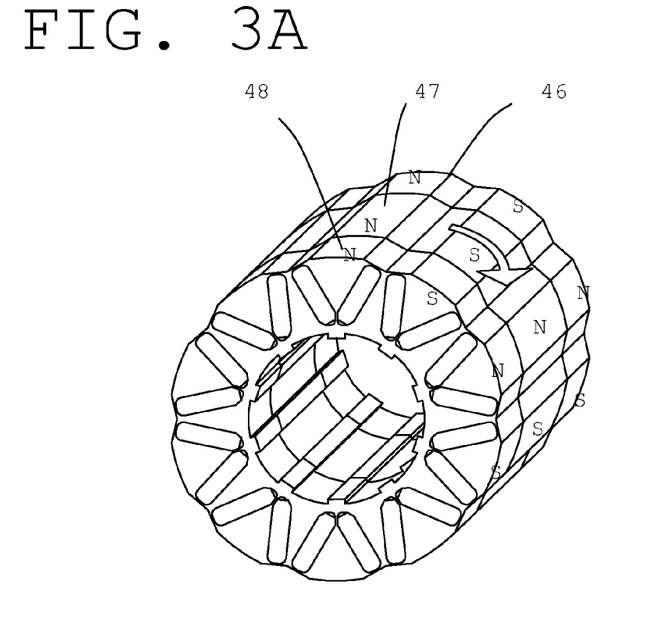
FIGS. 3A and 3B are views illustrating the principle of a variable field system.
Figure 3B:
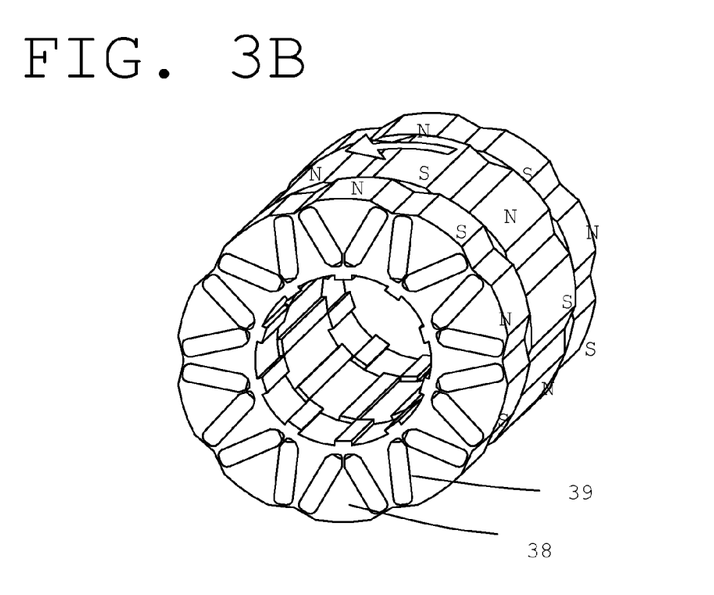

FIGS. 3A and 3B are views illustrating the principle of a variable field system.

FIG. 3A depicts a state where the middle field magnetic pole section 47 has rotated clockwise to a maximum extent. In this state, a magnetic pole of the middle field magnetic pole section 47 faces the same direction as magnetic poles of the load-side field-magnetic pole section 46 and the counter load-side field-magnetic pole section 48. Therefore, in this state, the strength of the field magnetism linking the stator winding 12 becomes the maximum.

FIG. 3B depicts a state where the middle field magnetic pole section 47 has rotated counterclockwise to a maximum extent. In this state, the magnetic pole of the middle field magnetic pole section 47 largely differs from the magnetic poles of the load-side field-magnetic pole section 46 and the counter load-side field-magnetic pole section 48. Therefore, the field magnetisms generated from the magnetic poles of the respective magnetic pole sections cancel each other out. Consequently, in this state, the strength of the field magnetism linking the stator winding 12 becomes relatively weak.

The control motor 49 can arbitrarily adjust the state of the field magnetic pole sections 46 to 48 between the states of FIG. 3A and FIG. 3B. Specifically, the control motor 49 can arbitrarily change the field magnetic strength.

The control motor 49 causes the middle field magnetic pole section 47 to rotate via the rotary mechanism. This allows relative rotation of the middle field magnetic pole section 47 with respect to the load-side field-magnetic pole section 46 and the counter load-side field-magnetic pole section 48.

The rotary mechanism is a mechanism for rotating the middle field magnetic pole section 47. The rotary mechanism includes a worm gear (reducer) 27, the shaft 34, a gear wheel (reducer) 23, an the external lead screw 42, an the internal lead screw 43, a pin (moving member) 36, a pin holder (moving member) 28, a mobile bearing 40, a fixed bearing 41, a slider (moving member) 37, and a hub (rotary member) 32 (see FIG. 1). Among these, the external lead screw 42 and the internal lead screw 43 constitute a lead screw mechanism.

The worm gear 27 and the gear wheel 23 constitute a worm reducer for transmitting a rotational force of the control motor 49 with a reduced rate of rotation. FIG. 6 is an explanatory view illustrating how the control motor 49 is provided. As illustrated, the control motor 49 is provided for the worm gear 27 of the rotary mechanism. The control motor 49 is provided for the worm gear 27 such that a rotational axis of the control motor 49 intersects with the shaft 34 substantially orthogonally.

The worm gear 27 transmits the rotational force of the control motor 49 with a reduced rate of rotation to the gear wheel 23. A bearing 26 rotatably supports the gear wheel 23. Therefore, the gear wheel 23 axially moves the external lead screw 42 illustrated in FIG. 1 with respect to the internal lead screw 43 by the rotational force transmitted from the worm gear 27.

The external lead screw 42 and the internal lead screw 43 engage each other. The internal lead screw 43 is axially secured to the shaft 34. By contrast, the external lead screw 42 is movable with respect to the internal lead screw 43 in the direction along which the shaft 34 extends (axially).

The external lead screw 42 and the internal lead screw 43 are trapezoidal threaded. The external lead screw 42 has a hexagon socket. The external lead screw 42 engages a hexagon shaft of the gear wheel 23 through this hexagon socket. Therefore, the external lead screw 42 is axially movable by the rotational force.

The mobile bearing 40 is mounted to a load side end of the external lead screw 42. The mobile bearing 40 is provided with two angular bearings facing toward each other. The mobile bearing 40 is secured to a bearing holder 44 by a bolt 45.

The fixed bearing 41 is mounted to the internal lead screw 43. The fixed bearing 41 is also provided with two angular bearings. The fixed bearing 41 is secured to the shaft 34 by a nut 29.

Figure 4:
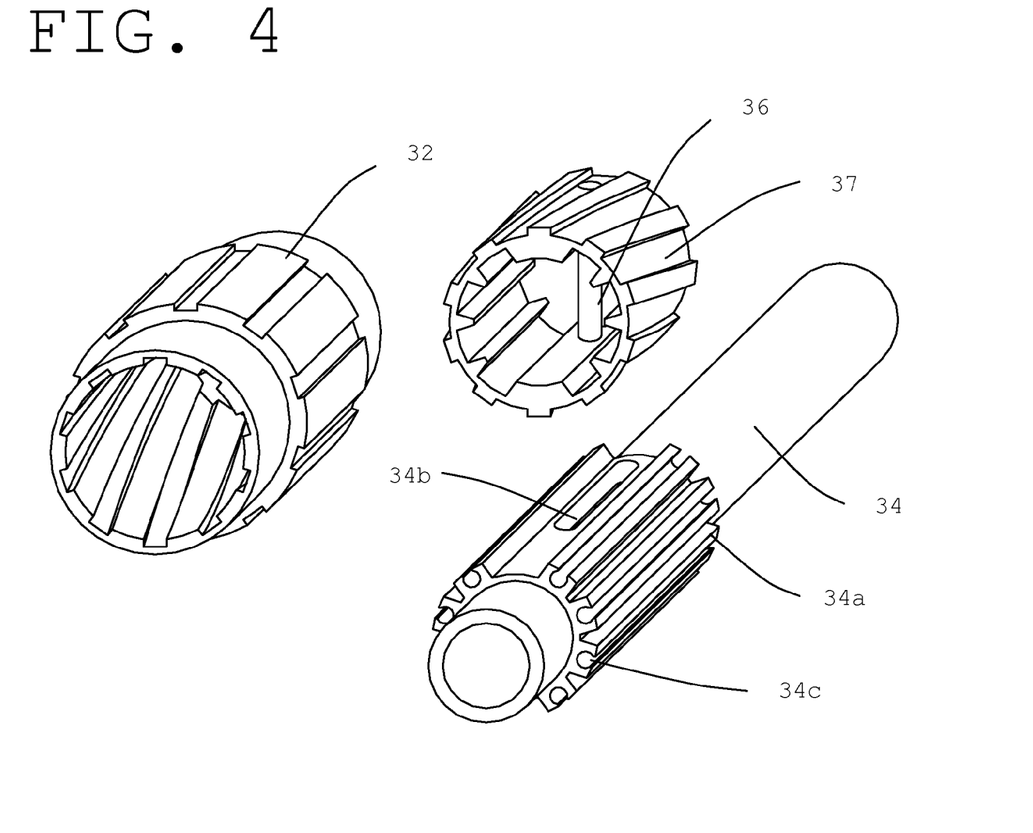
FIG. 4 is an explanatory view illustrating a configuration of a hub, a shaft, and a slider of a rotary mechanism.

FIG. 4 is an explanatory view illustrating a configuration of the hub 32, the shaft 34, and the slider 37 of the rotary mechanism.

The slider 37 is disposed such that its internal surface engages an external surface of the shaft 34. The pin 36 is installed in the slider 37. The pin holder 28 is attached to the pin 36. The pin holder 28 is coupled to the mobile bearing 40 of the external lead screw 42 via the bearing holder 44.

The shaft 34 has an elongate hole 34*b*. The pin 36 of the slider 37 is passed through the elongate hole 34*b*. Consequently, the pin 36 (the slider 37) is axially movable within a range of extension of the elongate hole 34*b*.

Further, the shaft 34 has a square spline 34*a*. The square spline 34*a* engages the internal surface of the slider 37. The square spline 34*a* is provided with a bolt-hole 34*c* for securing the load-side field-magnetic pole section 46 and the counter load-side field-magnetic pole section 48 to the shaft 34. The load-side field magnetic pole section 46 and the counter load-side field-magnetic pole section 48 are secured to the shaft 34 by the bolt 35 through the bolt-hole 34*c*.

The hub 32 is disposed such that its internal surface engages an external surface of the slider 37. The external surface of the slider 37 and the internal surface of the hub 32 engage each other through twisted spline. An O-ring 15 is mounted on both sides of the hub 32. The O-ring 15 reduces the spread of grease that fills the rotary mechanism.

Figure 5:
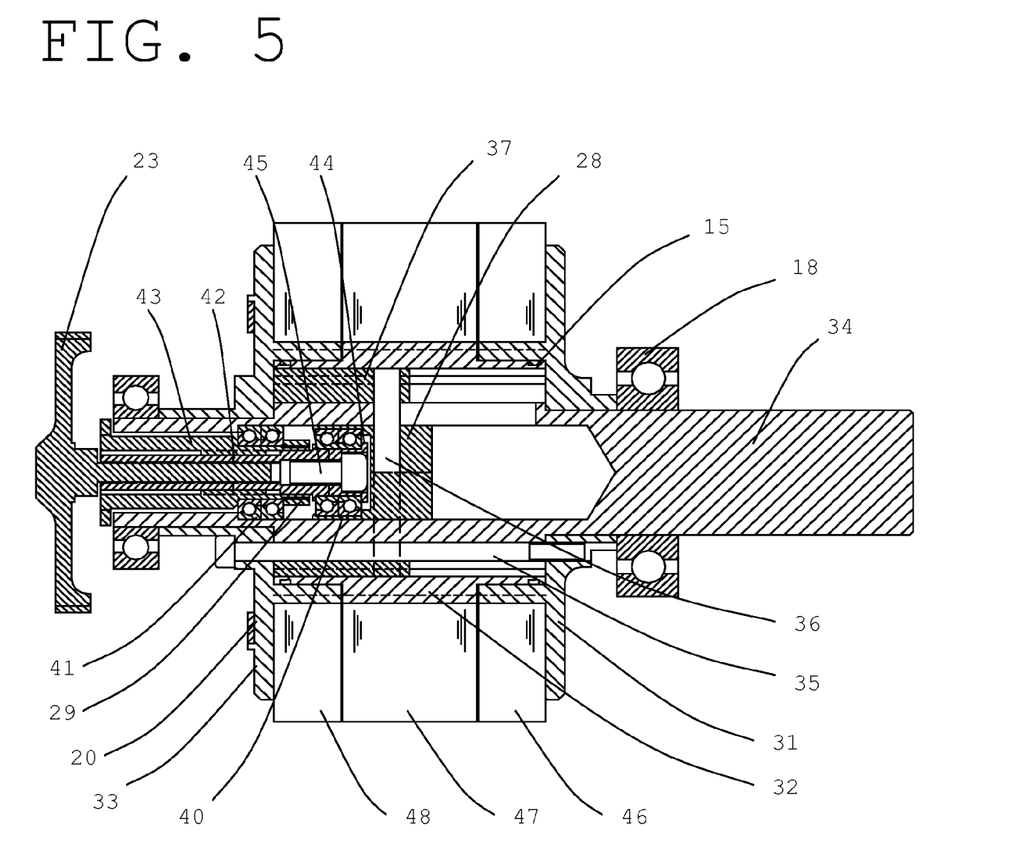
FIG. 5 is an axial sectional view illustrating a structure of a rotor.
Figure 7:
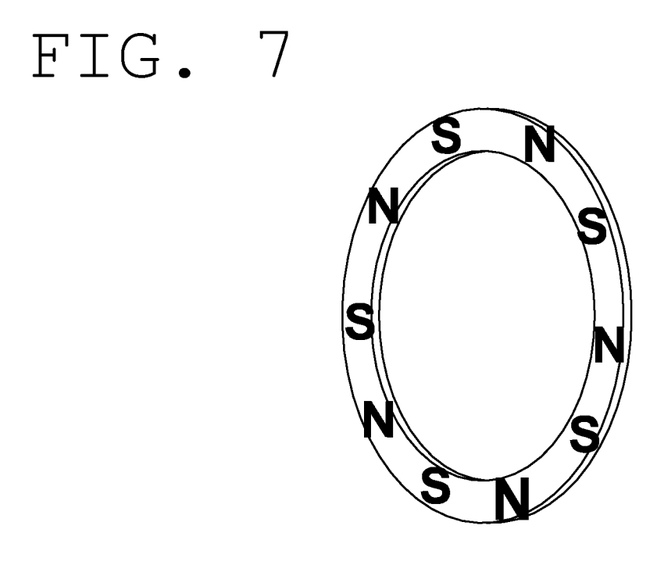
FIG. 7 is an explanatory view illustrating a sensor magnet.

FIG. 7 is an explanatory view illustrating the sensor magnet 20. The sensor magnet 20 is a permanent magnet made of a resin having a high heat resistance property. The sensor magnet 20 is magnetized with magnetic poles as many as the field magnetic poles of the rotor 30. As illustrated in FIG. 5, the sensor magnet 20 is mounted on a side surface of a counter load side plate 33 such that the magnetic pole of the sensor magnet 20 matches those of the field magnetic pole sections 46 and 48 on the both sides. Therefore, by detecting a position of the magnetic pole of the sensor magnet 20, it is possible to detect positions of the magnetic poles of the field magnetic pole sections 46 and 48 on the both sides.

The following briefly describes an operation relating to the rotation of the middle field magnetic pole section 47 by the control motor 49.

The control motor 49 causes the worm gear 27 to rotate. This in turn rotates the gear wheel 23. As a result, the external lead screw 42 illustrated in FIG. 1 moves axially with respect to the internal lead screw 43. The mobile bearing 40 is mounted on the load side end of the external lead screw 42. Therefore, in a state where the rotation of the rotor 30 is blocked, the external lead screw 42 causes the pin 36 and the pin holder 28 to move axially via the mobile bearing 40 and the bearing holder 44. As a result, the pin 36 causes the slider 37 outside the shaft 34 to move axially.

The slider 37 and the hub 32 engage each other via the twisted spline. Therefore, when the slider 37 moves axially, the hub 32 and the middle field magnetic pole section 47 that engages the hub 32 relatively rotate with respect to the load-side field-magnetic pole section 46 and the counter load-side field-magnetic pole section 48 secured to the shaft 34.

FIG. 5 is an axial sectional view illustrating a structure of the rotor.

The first rotary electric machine illustrated in FIG. 1 is in a state where the slider 37 has moved to the load side, and thus the field magnetism is weakened. By contrast, the first rotary electric machine illustrated in FIG. 5 is in a state where the slider 37 has moved to the counter load side, and thus the field magnetism is strengthened.

A lead angle of the twisted spline through which the slider 37 and the hub 32 engage each other can be substantially perpendicular to a circumferential direction of the shaft 34. In this case, rotational torque of the hub 32 can be increased even if an axial thrust force applied to the slider 37 is small. In contrast, the axial thrust force is less likely to be affected even if rotational torque or driving torque acting upon the hub 32 is large.

According to the first rotary electric machine, the fixed bearing 41 is secured to the shaft 34. Therefore, it is possible to suppress that the axial thrust force generated by the control motor 49 acts upon a load side bearing 18 and a counter-load side bearing 19 of the rotor 30, and lifetime of these bearings 18 and 19 is consequently reduced.

Further, the lead screw mechanism (the mobile bearing 40 and the fixed bearing 41) is installed in the shaft 34. Therefore, it is possible to reduce an axial length of the first rotary electric machine.

Moreover, the control motor 49 is provided such that its rotational axis intersects with the shaft 34 substantially orthogonally. Therefore, it is possible to reduce an axial size of the first rotary electric machine.

As described above, the field magnetic pole sections 46 and 48 on the both sides are disposed such that the rotation of the middle field magnetic pole section 47 about the shaft 34 changes a relative angle between the two groups of the field magnetic pole sections (the relative angle between the field magnetic pole sections 46 and 48 and the middle field magnetic pole section 47). The relative angle can be set to be large when a torque command is small as will be described later, in order to realize vector control at peak efficiency of the variable field magnet rotary electric machine applied to an electric motor or electric generator for driving a vehicle. Further, when the torque command is large, the relative angle can be set to be small.

For example, assume that the rotor illustrated in FIGS. 3A and 3B is, a rotor for a rotary electric machine for driving a vehicle operated as an electric motor in a clockwise direction. In this case, when the torque command is as small as nearly no-load, a north pole and a south pole attract to each other between the two groups of the field magnetic pole sections (between the field magnetic pole sections 46 and 48 on the both sides and the middle field magnetic pole section 47). Therefore, the control motor 49 can increase the relative angle between the two groups of the field magnetic pole sections illustrated in FIG. 3B with small torque. When the torque command is large for acceleration, the rotatable middle field magnetic pole section 47 is attracted to a rotating electromagnetic force generated by the stator 10. Therefore, the control motor 49 can decrease the relative angle between the two groups of the field magnetic pole sections illustrated in FIG. 3A by this amount with small torque.

Figure 8:
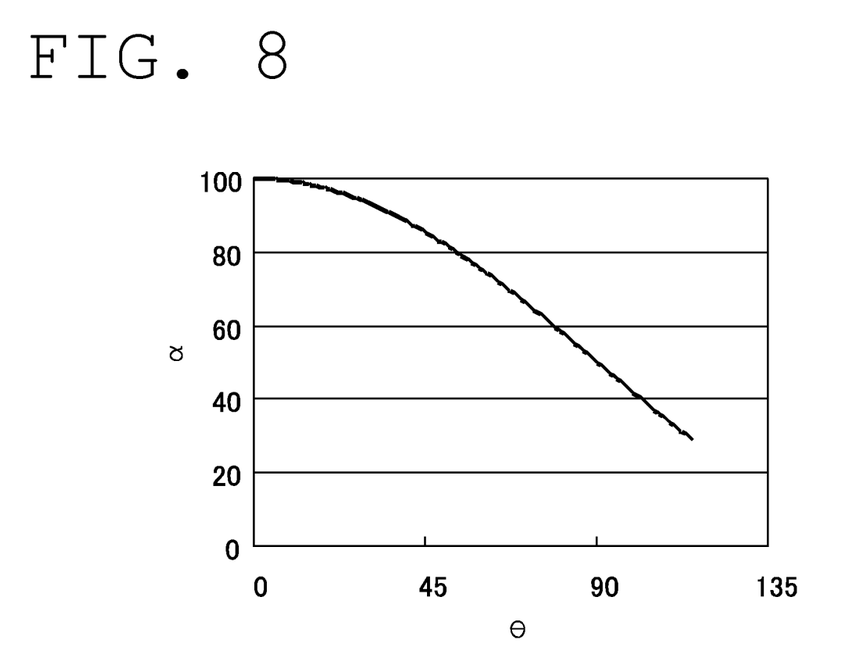
FIG. 8 is a characteristic chart showing a relation between a relative angle between two groups of field magnetic pole sections and the field magnetic strength.

FIG. 8 is a characteristic chart showing a relation between the relative angle between the two groups of the field magnetic pole sections and the field magnetic strength.

Here, a magnitude of an induced voltage constant is defined 100% in a state where the two groups of the field magnetic pole sections are aligned and the field magnetic strength is the maximum. Also the term "field ratio" refers to a proportion of the induced voltage constant in a state where the two groups of the field magnetic pole sections rotate with respect to each other (in a state where the middle field magnetic pole section 47 relatively rotates with respect to the field magnetic pole sections 46 and 48 on the both sides). In this case, a characteristic of a field ratio $\alpha$ to a relative angle $\theta$ between the two groups of the field magnetic pole sections is as illustrated in FIG. 8. As shown in this figure, the field ratio $\alpha$ can vary from 100% to 30% by changing the relative angle $\theta$ from 0 degrees to 120 degrees.

Figure 9A:
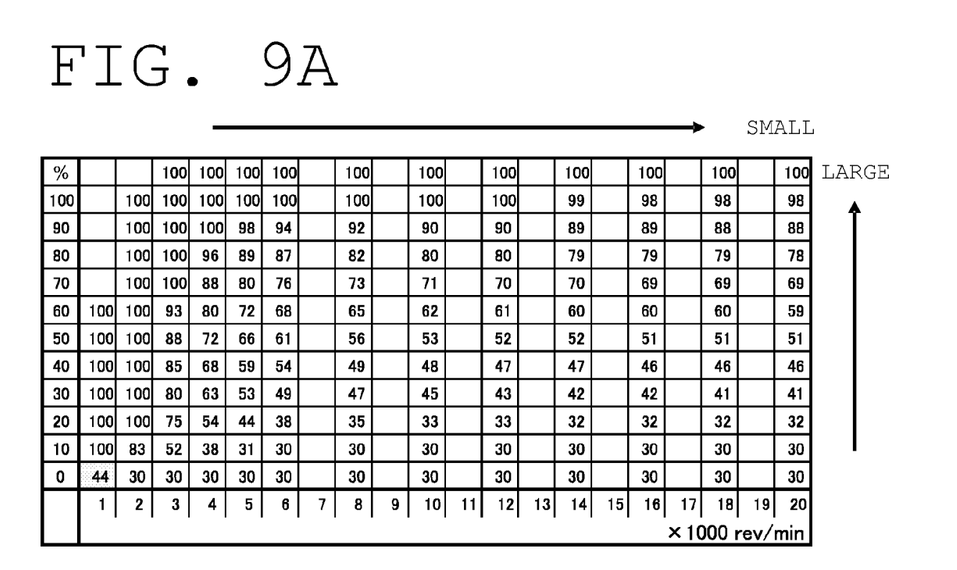
FIGS. 9A and 9B are charts of control values mapped upon vector control of the rotary electric machine at peak efficiency (measurement example)
Figure 9B:
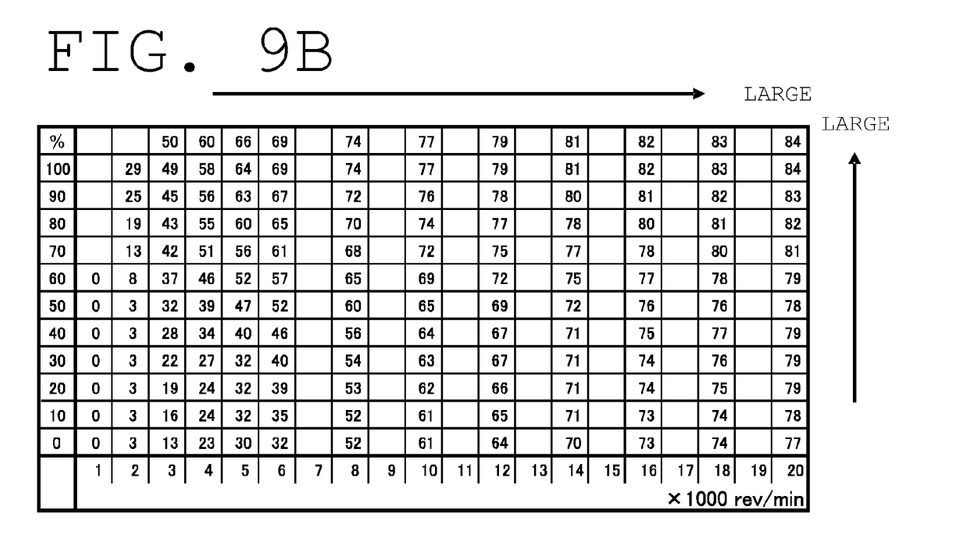

FIGS. 9A and 9B are charts of control values mapped upon vector control of the first rotary electric machine at peak efficiency (measurement example).

The horizontal axis in these charts represents a rate of rotation of the rotor 30. The vertical axis represents a power output ratio of the stator 10. FIG. 9A depicts the field ratio. FIG. 9B depicts a phase angle of a three-phase current conducting the stator winding 12 with respect to the position of the magnetic pole integrally generated by the two groups of the field magnetic pole sections (the field magnetic pole sections 46 and 48 and the middle field magnetic pole section 47). When the phase angle is larger, the rotating electromagnetic force generated by the stator 10 on the magnetic pole of the rotor 30 leads the angle and weakened field magnetism increases.

As illustrated in FIGS. 9A and 9B, for example, when the rate of rotation of the rotor 30 is 16000 rev/min and the power output ratio of the stator 10 is 70%, the efficiency of the first rotary electric machine becomes the maximum, by adjusting the relative angle between the two groups of the field magnetic pole sections such that the field ratio becomes 69%, and by setting the phase angle of the current to be 78 degrees.

The following is apparent from these maps. In order to maximize the variable field magnet rotary electric machine, the control may be performed such that the higher the rate of rotation of the rotor 30 is and the lower the output of the stator 10 is, the smaller the field ratio is set, and such that the higher the rate of rotation of the rotor 30 is and the higher the output of the stator 10 is, the larger the phase angle of the current is set.

Figure 10:
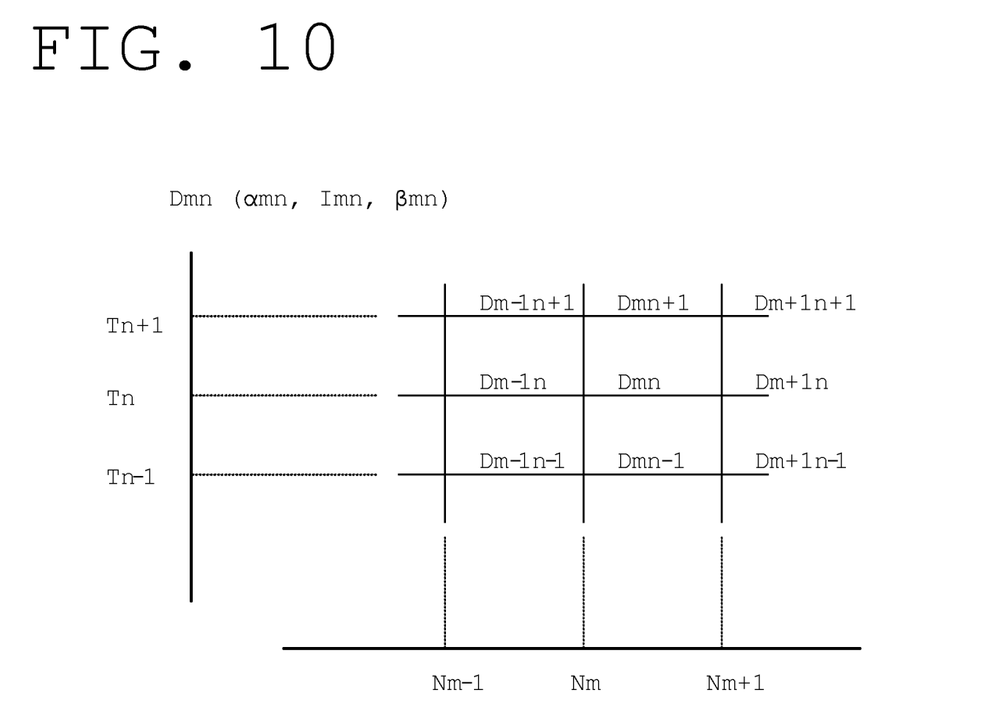
FIG. 10 is an illustrative chart of map control reproducing the vector control at peak efficiency.

FIG. 10 is an illustrative chart of map control reproducing the vector control at peak efficiency.

In actual map control for the variable field magnet rotary electric machine for driving a vehicle, the output is replaced by a torque command for convenience sake. A pressure on an accelerator pedal corresponds to a magnitude of the torque command. The field ratio $\alpha$, a phase angle $\beta$ of the current, and a current value I are read based on a rate of rotation N of the rotor 30 and a torque command T. Feedback control taking the above values as target values is performed such that an error is smaller than a set value.

Specifically, when the rate of rotation of the rotor 30 is from Nm to Nm+1, and when the torque command is from Tn to Tn+1, the data is read from a section Dmn. The section Dmn stores three pieces of data including a field ratio αmn, a phase angle βmn of the current, and a current value Imn. When the rate of rotation decreases down to a value from Nm−1 to Nm, the data is read from a section Dm−1n. The data for control is prepared for all of the rates of rotation and the torque commands at which the rotary electric machine can be operated.

Second Embodiment

Figure 11:
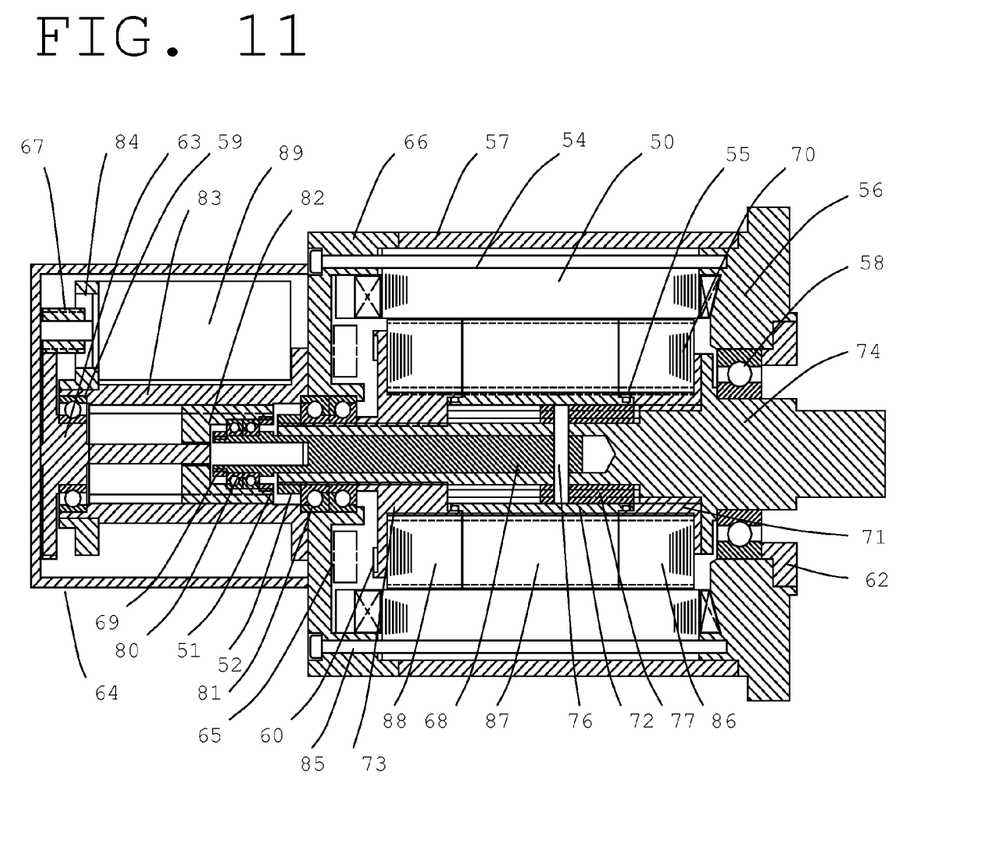
FIG. 11 is an axial sectional view of a rotary electric machine according to a second embodiment of the disclosure.

In the above, the first rotary electric machine has been described. Next, a rotary electric machine (second rotary electric machine) according to a second embodiment of the disclosure will be described with reference to FIG. 11. FIG. 11 is an axial sectional view of the second rotary electric machine applied to an electric motor or electric generator for driving a vehicle. While the first rotary electric machine is configured to have a small axial size, the second rotary electric machine can be configured to have a small radial size. Providing rotary electric machines having a small axial size and rotary electric machines having a small radial size allows to accommodate different mounting forms applicable to various electric motors and electric generators for driving vehicles.

As illustrated in FIG. 11, in the second rotary electric machine, a lead screw mechanism for rotating the two groups of the magnetic pole sections with respect to each other is provided on the outside of a shaft 74. Further, a rotational axis of a control motor 89 is substantially parallel to the shaft 74. The second rotary electric machine is different from the first rotary electric machine in these points. The configuration of the second rotary electric machine other than above points is substantially the same as that of the first rotary electric machine. Accordingly, for convenience sake, the following description will be given focusing on differences from the first embodiment.

In the second rotary electric machine, the lead screw mechanism having an external lead screw 82 and an internal lead screw 83 is provided on the outside of a counter load side of the shaft 74.

The rotary mechanism of the second rotary electric machine includes the lead screw mechanism, a pinion gear (reducer) 67, a gear wheel (reducer) 63, the shaft 74, a pin (moving member) 76, a pin holder (moving member) 68, a mobile bearing 80, a fixed bearing 81, a slider (moving member) 77, and a hub (rotary member) 72.

The mobile bearing 80 is mounted to the external lead screw 82. The mobile bearing 80 is provided with two angular bearings facing toward each other. The mobile bearing 80 is secured to a motor holder 84 by a nut 51.

The fixed bearing 81 is mounted to the internal lead screw 83. The fixed bearing 81 is also provided with two angular bearings. The fixed bearing 81 is secured in a state sandwiched by a counter load side bracket 66 and the shaft 74. The fixed bearing 81 also serves as a counter-load side bearing of a rotor 70.

The external lead screw 82 has a hexagon socket. The external lead screw 82 engages a hexagon shaft of the gear wheel 63 through this hexagon socket. Therefore, the external lead screw 82 is axially movable by receiving the external rotational force.

Further, the control motor 89 is placed such that its rotational axis is substantially parallel to the shaft 74 of the rotor 70 of the second rotary electric machine and such that its output axis is directed toward the counter load side of the second rotary electric machine. The pinion gear 67 is attached to the output axis of the control motor 89. The pinion gear 67 transmits the rotational force of the control motor 89 with a reduced rate of rotation to the gear wheel 63.

Figure 12:
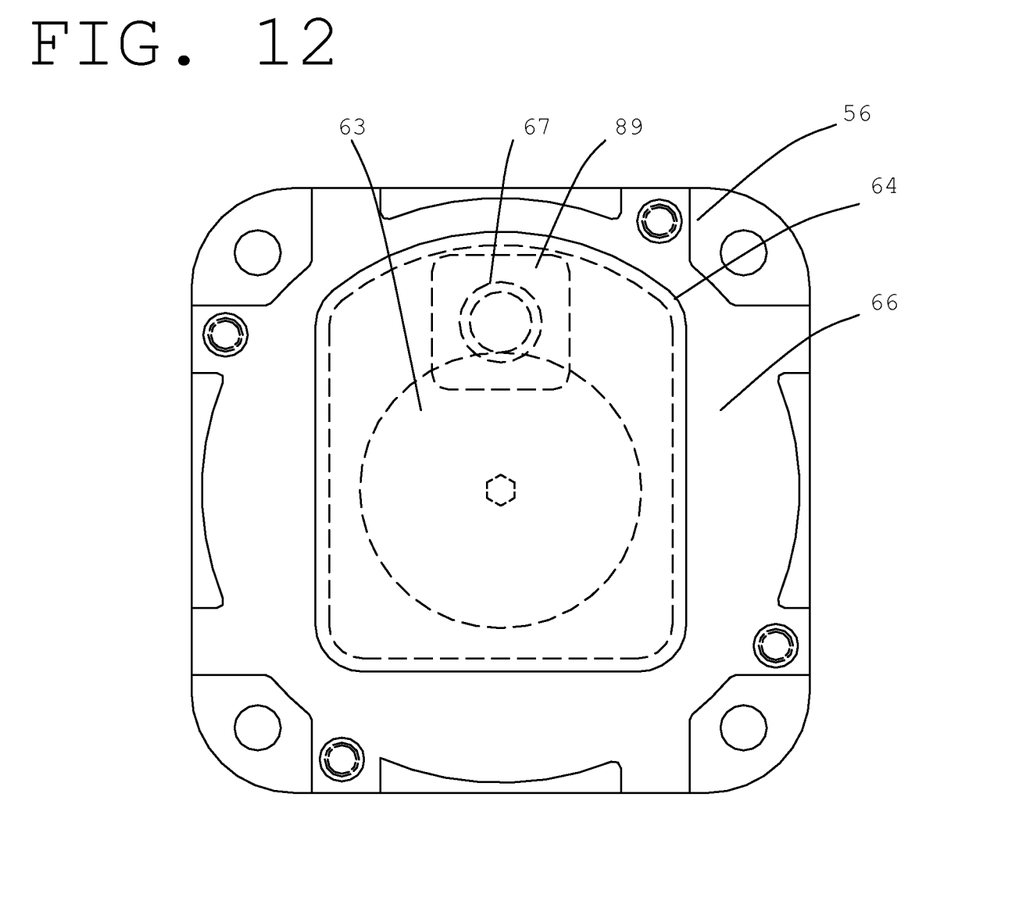
FIG. 12 is a side view of a counter load side of the rotary electric machine.

FIG. 12 is a side view on the counter load side of the second rotary electric machine.

The control motor 89 is provided above the rotational axis of the rotor 70. As illustrated in FIG. 12, the control motor 89 causes the pinion gear 67 to rotate. This drives the gear wheel 63. The pinion gear 67 and the gear wheel 63 constitute a reducer. The reducer is lubricated with grease. A cover 64 is provided in order to protect the reducer.

Similarly to the first rotary electric machine, the field magnetic pole of the rotor 70 of the second rotary electric machine is axially divided into three sections. Specifically, the field magnetic pole of the rotor 70 includes a load-side field-magnetic pole section 86, a middle field magnetic pole section 87, and a counter load-side field-magnetic pole section 88. The load-side field-magnetic pole section 86 and the counter-load-side field-magnetic pole section 88 are mating with and secured to the shaft 74. The middle field magnetic pole section 87 rotates about the shaft 74.

An O-ring 55 is mounted on both sides of the hub 32. The O-ring 55 is provided to reduce the spread of grease that fills the rotary mechanism.

The following briefly describes an operation relating to the rotation of the middle field magnetic pole section 87 by the control motor 89.

The control motor 89 causes the pinion gear 67 to rotate. This in turn rotates the gear wheel 63. As a result, the external lead screw 82 moves axially relative to the internal lead screw 83. The mobile bearing 80 is mounted to the load side end of the external lead screw 82. Therefore, in a state where the rotation of the rotor 70 is blocked, the external lead screw 82 causes the pin 76 and the pin holder 68 to move axially via the mobile bearing 80 and the motor holder 84.

With this movement, similarly to the first rotary electric machine, the pin 76 causes the slider 77 provided on the outside of the shaft 74 to move axially. As a result, the hub 72 and the middle field magnetic pole section 87 that engages the hub 72 relatively rotate with respect to the load-side field-magnetic pole section 86 and the counter-load-side field-magnetic pole section 88 secured to the shaft.

As described above, the first and the second rotary electric machine of a variable field magnet type can achieve an operation in a wider range and at higher efficiency by accurately adjusting the relative angle between the two groups of the field magnetic pole sections by the control motor. Using such rotary electric machines further improves a rate of electricity consumption of a variable field magnet rotary electric machine for driving a vehicle as compared to the conventional technique.

According to the first and the second rotary electric machine, the field magnetic pole sections on the both side can be placed such that the rotation in the rotational direction of the rotor reduces the relative angle between the two groups of the field magnetic pole sections.

Further, the rotary electric machine according to the disclosure can be embodied as a rotary electric machine according to any of aspects 1 to 17. Specifically, the rotary electric machine according to the aspect 1 is provided with: a stator having a stator winding and a stator core; a rotor having a plurality of magnetic pole sections each having a field magnet, the magnetic pole sections being divided into two groups such that the groups rotate with respect to each other; and a mechanism for rotating the two groups of the magnetic pole sections with respect to each other. Here, the mechanism is fitted by screw with a member for supporting the magnetic pole sections that rotate with respect to a shaft, and includes a member axially movable outside the shaft, a lead screw mechanism for axially moving the axially-movable member, a bearing for coupling the lead screw mechanism and a member rotating along with the rotor, and a control motor for causing the lead screw mechanism to rotate.

According to the rotary electric machine of the aspect 1, it is possible to provide a variable field magnet rotary electric machine that achieves an operation in a wider range and at higher efficiency by accurately adjusting a relative angle between the two groups of the field magnetic pole sections.

The rotary electric machine according to the aspect 2 is the rotary electric machine of the aspect 1, in which rotation of the control motor causes the two groups of the magnetic pole sections to rotate with respect to each other.

The rotary electric machine according to the aspect 3 is the rotary electric machine of the aspect 1 or 2, in which the bearing that couples the member rotating along with the rotor and the lead screw mechanism is an angular bearing.

The rotary electric machine according to the aspect 4 is the rotary electric machine of one of the aspects 1 to 3, in which the bearing that couples the member rotating along with the rotor and the lead screw mechanism is provided in two pairs, and one is secured to an internal thread of the lead screw mechanism and the other is secured to an external thread of the lead screw mechanism.

The rotary electric machine according to the aspect 5 is the rotary electric machine of one of the aspects 1 to 4, in which the member that supports the magnetic pole sections rotating about the shaft and the member axially movable outside the shaft are fitted by twisted spline.

The rotary electric machine according to the aspect 6 is the rotary electric machine of one of the aspects 1 to 5, in which one of the two groups of the magnetic pole sections rotates about the shaft when the member axially movable outside the shaft moves axially.

The rotary electric machine according to the aspect 7 is the rotary electric machine of one of the aspects 1 to 6, in which the lead screw mechanism is installed in the shaft.

The rotary electric machine according to the aspect 8 is the rotary electric machine of one of the aspects 1 to 7, in which a reducer decelerates the rate of rotation of the control motor to rotate the lead screw mechanism.

The rotary electric machine according to the aspect 9 is the rotary electric machine of the aspect 8, in which the reducer is a worm reducer.

The rotary electric machine according to the aspect 10 is the rotary electric machine of one of the aspects 1 to 9, in which the control motor is provided such that its rotational axis is substantially perpendicular to the shaft of the rotary electric machine.

The rotary electric machine according to the aspect 11 is the rotary electric machine of one of the aspects 1 to 10, in which the control motor is provided such that its rotational axis is in parallel to the shaft of the rotary electric machine and so as to face away from the rotary electric machine.

The rotary electric machine according to the aspect 12 is the rotary electric machine of one of the aspects 1 to 11, in which the rotation of the field magnetic pole sections on the both sides in the rotational direction of the rotor reduces the relative angle between the two groups of the field magnetic pole sections.

The rotary electric machine according to the aspect 13 is the rotary electric machine of one of the aspects 1 to 12, in which the relative angle between the two groups of the magnetic poles is increased as the rate of rotation is higher or as the torque for a torque command is lower.

The rotary electric machine according to the aspect 14 is the rotary electric machine of one of the aspects 1 to 13 operated while vector control and field magnetism control are performed.

The rotary electric machine according to the aspect 15 is the rotary electric machine of one of the aspects 1 to 14, in which a phase angle of current is increased as the rate of rotation is higher or as the torque for a torque command is higher.

The rotary electric machine according to the aspect 16 is the rotary electric machine of one of the aspects 1 to 15, in which target values of the relative angle between the two groups of the field magnetic pole sections, and the current and the phase angle are reproduced by map control according to the rate of rotation and the torque command.

The rotary electric machine according to the aspect 17 is the rotary electric machine of one of the aspects 1 to 16, in which the mechanism is installed in the shaft of the rotor, and the control motor for driving the mechanism is provided on the outside of the rotor.

According to the above rotary electric machines, it is possible to provide a variable field magnet rotary electric machine that achieves an operation in a wider range and at higher efficiency by accurately adjusting a relative angle between the two groups of the field magnetic pole sections.

The embodiments according to the disclosure have been described. However, it would be apparent for a person skilled in the art that various modifications can be made based on the above embodiments, and combinations of techniques according to the embodiments and variations can be utilized as needed without departing from the spirit of the disclosure. Specifically, it would be understood that such techniques with modifications are included within the technical scope of the disclosure.

For example, according to the embodiment, the control motor for varying the field magnetism is provided on the counter load side of the rotary electric machine. However, examples are not limited to the above configuration, and the control motor can be provided on the load side of the shaft. In this case, an axial thrust force member for rotating the two groups of the magnetic pole sections with respect to each other can be provided for the load side end of the shaft.

The rotary electric machine according to the disclosure realizes an operation in a wide range and at high efficiency. Therefore, the rotary electric machine according to the disclosure can be applied to, but not limited to an application for driving vehicles, other rotary electric machines in general industrial applications, such as rotary electric machines for main shafts for machine tools.

What is claimed is:

1. A rotary electric machine comprising:
   a stator having a stator winding and a stator core;
   a rotor having a first magnetic pole section and a second magnetic pole section, where the second magnetic pole section rotates respective to the first magnetic pole section;
   a shaft provided for the rotor; and
   a rotary mechanism configured to rotate the second magnetic pole section about the shaft, wherein
   the rotary mechanism includes:
      a moving member configured to be movable along the shaft;
      a lead screw mechanism configured to move the moving member along the shaft by acting on the moving member from an inside of the shaft; and a rotary member configured to rotate respective to the shaft along with the second magnetic pole section, where the rotary member engages the moving member and the second magnetic pole section.

2. The rotary electric machine according to claim 1, further comprising:
a control motor configured to actuate the rotary mechanism.

3. The rotary electric machine according to claim 2, wherein
the lead screw mechanism further includes:
a secured internal lead screw; and
an external lead screw configured to move along the shaft by a rotational force of the control motor, where the external lead screw engages the internal lead screw.

4. The rotary electric machine according to claim 3, wherein
the external lead screw and the internal lead screw have bearings, respectively.

5. The rotary electric machine according to claim 4, wherein
the bearing is an angular bearing.

6. The rotary electric machine according to claim 2, wherein
the rotary mechanism further includes a reducer, and
the reducer is configured to transmit a rotational force of the control motor to the lead screw mechanism with a reduced rate of rotation.

7. The rotary electric machine according to claim 6, wherein
the reducer is a worm reducer.

8. The rotary electric machine according to claim 2, wherein
a rotational axis of the control motor is substantially perpendicular to the shaft.

9. The rotary electric machine according to claim 2, wherein
a rotational axis of the control motor is substantially parallel to the shaft.

10. The rotary electric machine according to claim 2, wherein
the rotary mechanism is installed in the shaft, and the control motor is provided on the outside of the rotor.

11. The rotary electric machine according to claim 1, wherein
the moving member and the rotary member engage each other by a twisted spline.

12. The rotary electric machine according to claim 11, wherein
a lead angle of the twisted spline is substantially perpendicular to a circumferential direction of the shaft.

13. The rotary electric machine according to claim 1, wherein
the lead screw mechanism is installed in the shaft.

14. The rotary electric machine according to claim 1, wherein
the first magnetic pole section is provided along the shaft so as to sandwich the second magnetic pole section.

15. The rotary electric machine according to claim 1, wherein
vector control and field magnetism control are performed in operation.

16. The rotary electric machine according to claim 1, wherein
a phase angle of a current conducting through the stator winding is set to have a larger value either as a rate of rotation of the rotor is higher, or as a torque command is higher.

17. The rotary electric machine according to claim 1, further comprising:
a sensor magnet configured to detect a position of a magnetic pole of the first magnetic pole section.

18. A rotary electric machine comprising:
a stator having a stator winding and a stator core;
a rotor having a first magnetic pole section and a second magnetic pole section, where the second magnetic pole section rotates respective to the first magnetic pole section;
a shaft provided for the rotor; and
a rotary mechanism configured to rotate the second magnetic pole section about the shaft, wherein
the rotary mechanism includes:
a moving member configured to be movable along the shaft;
a lead screw mechanism configured to move the moving member along the shaft; and
a rotary member configured to rotate respective to the shaft along with the second magnetic pole section, where the rotary member engages the moving member and the second magnetic pole section, and
a relative angle between the first magnetic pole section and the second magnetic pole section is set to have a larger value either as a rate of rotation of the rotor is higher, or as a torque command is smaller.

19. A rotary electric machine comprising:
a stator having a stator winding and a stator core;
a rotor having a first magnetic pole section and a second magnetic pole section, where the second magnetic pole section rotates respective to the first magnetic pole section;
a shaft provided for the rotor; and
a rotary mechanism configured to rotate the second magnetic pole section about the shaft, wherein
the rotary mechanism includes:
a moving member configured to be movable along the shaft;
a lead screw mechanism configured to move the moving member along the shaft; and
a rotary member configured to rotate respective to the shaft along with the second magnetic pole section, where the rotary member engages the moving member and the second magnetic pole section, and
a target value for a relative angle between the first magnetic pole section and the second magnetic pole section and target values for a current value and a phase angle of a current conducting through the stator winding are reproduced by map control according to a rate of rotation of the rotor and a torque command.

* * * * *